United States Patent Office.

ABEL MESSEX, OF WAYNESBORO, GEORGIA.

Letters Patent No. 62,282, dated February 19, 1867.

IMPROVED MEDICINE.

The Schedule referred to in these Letters Patent and making part of the same.

TO ALL WHOM IT MAY CONCERN:

Be it known that I, ABEL MESSEX, of Waynesboro, in the county of Burke, in the State of Georgia, have discovered a new and improved Composition, Mixture, or Medicine for the cure of small-pox; and I do hereby declare that the following is a full and exact description thereof, to wit:

1. One pint of tea made from root species of galium, (*Galium trifidum.*)
2. One pint of tea made from root of holly.
3. One pint of tea made from china brier root.
4. One gallon tea made of root of red sassafras.

Mix all the above teas together. For an adult give every four hours two tablespoonsful, mixed with double the quantity of warm water; for children over twelve years of age the same quantity; children under twelve, one tablespoonful. All of the above roots grow abundantly in Georgia, and are presumed, also, to grow in any southern State or warm climate.

What I claim as my discovery, and desire to secure by Letters Patent, is—

The composition, mixture, or medicine above described for the cure of small-pox, which is made by following substantially the directions and descriptions above set forth.

ABEL MESSEX.

Witnesses:
    JOHN J. JONES,
    JOHN ATTAWAY.